(12) United States Patent
Lu et al.

US006351487B1

(10) Patent No.: US 6,351,487 B1
(45) Date of Patent: Feb. 26, 2002

(54) DIGITAL SUBSCRIBER LINE DEVICE DRIVER USING COMMUNICATION WINDOW SIZE BASED ON RELATIVE DATA RATES OF UPSTREAM AND DOWNSTREAM COMMUNICATIONS

(75) Inventors: Xiaolin Lu, Plano; Dennis G. Mannering, Garland, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/156,296

(22) Filed: Sep. 17, 1998

Related U.S. Application Data
(60) Provisional application No. 60/059,189, filed on Sep. 17, 1997.

(51) Int. Cl.$^7$ .......................... H04B 3/46; H04B 17/00; H04Q 1/20
(52) U.S. Cl. ....................... 375/225; 709/232; 370/252
(58) Field of Search ................................ 375/219, 221, 375/222, 224, 225; 370/252, 253; 709/319, 227, 329, 232

(56) References Cited

U.S. PATENT DOCUMENTS 5,852,630 A * 12/1998 Langberg et al. .......... 375/219
5,978,373 A * 11/1999 Hoff et al. .................. 370/392
6,041,356 A * 3/2000 Mohammed ................ 709/227

* cited by examiner

Primary Examiner—Jean Corrielus
(74) Attorney, Agent, or Firm—J. Dennis Moore; W. James Brady, III; Frederick J. Telecky, Jr.

(57) ABSTRACT

A computer system (12) comprising a first DSL modem ($M_{12}$) for communicating data packets ($MG_1$, $MG_2$, $MG_3$) with a second DSL modem ($M_{14}$) after a connection is established between the first DSL modem and the second DSL modem. The data packets are for communication from the first DSL modem to the second DSL modem at a downstream communications rate and for communication from the second DSL modem to the first DSL modem at an upstream communications rate. The computer system further comprises a memory ($MEM_{12}$) operable to store a computer program (60), where in one embodiment this computer program is an operating system. The computer program is operable to require a data parameter indicating a number of data packets which may be communicated in an instance from the computer program to the first DSL modem for communication to the second DSL modem. Lastly, the computer system further comprises a field (e.g., SendWindow field) for providing the data parameter to the computer program, wherein the number is responsive to the ratio of the downstream communications rate relative to the upstream communications rate.

25 Claims, 3 Drawing Sheets

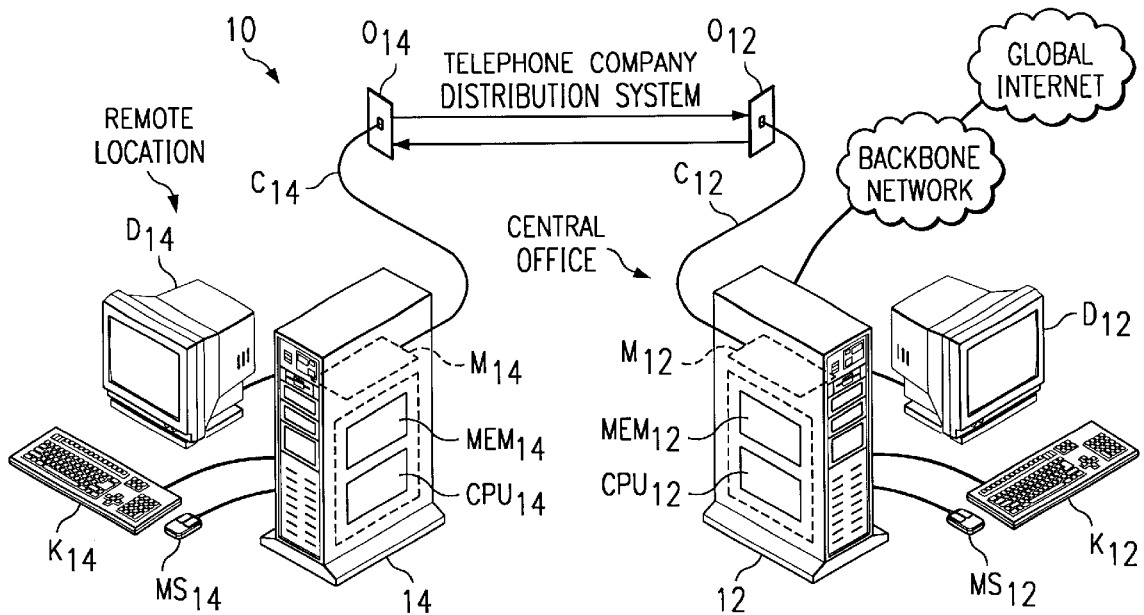
FIG. 1
FIG. 3
| MG$_1$ | | | MG$_2$ | | | MG$_3$ | | |
|---|---|---|---|---|---|---|---|---|
| F$_1$ | F$_2$ | F$_3$ | F$_4$ | F$_5$ | F$_6$ | F$_7$ | F$_8$ | F$_9$ |
FIG. 4
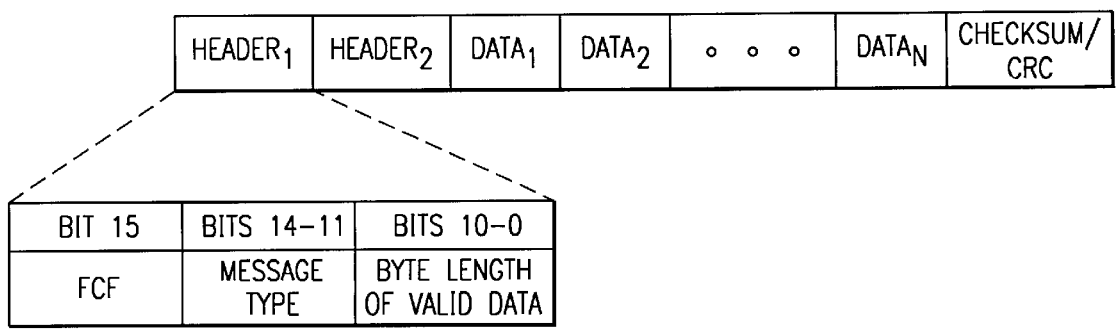

DIGITAL SUBSCRIBER LINE DEVICE DRIVER USING COMMUNICATION WINDOW SIZE BASED ON RELATIVE DATA RATES OF UPSTREAM AND DOWNSTREAM COMMUNICATIONS

CROSS-REFERENCES TO RELATED APPLICATIONS

This application claims the benefit, under 35 U.S.C. §119(e)(1), of U.S. Provisional Application No. 60/059,189, entitled "Performance Improvement For Asymmetric MDSL Modem," having as its inventors Ms. Xiaolin Lu and Mr. Dennis Guy Mannering, filed Sep. 17, 1997, now abandoned, and hereby incorporated herein by this reference.

This application is related to U.S. patent application Ser. No. 09/000,899 entitled "Modem Device Driver In A Digital Subscriber Line Telecommunications System," filed Dec. 30, 1997, and having as its inventors Ms. Xiaolin Lu and Mr. Dennis Guy Mannering, now abandoned, and hereby incorprated herein by this reference.

This application is related to copending U.S. patent application Ser. No. 09/109,340, entitled "Circuits, Systems, And Methods For Error Elimination In A Digital Subscriber line Modem", having as its inventors Mr. Dennis Guy Mannering and Mr. Song Wu, filed Jun. 30, 1998, and hereby incorporated herein by this reference.

This application is related to U.S. patent application Ser. No. 09/001,125, entitled "Modem Host Interface In A Digital Subscriber Line Telecommunications System", having as its inventors Ms. Xiaolin Lu and Mr. Dennis Guy Mannering, filed Dec. 30, 1997, now abandoned, and hereby incorporated herein by this reference.

BACKGROUND OF THE INVENTION

The present embodiments relate to digital subscriber line ("DSL") technology, and are more particularly directed to a system with a modem device driver using a communication window size based on relative data rates of upstream and downstream communications.

The exchange of digital information between remotely located computers is now a pervasive part of modem computing, and occurs in all sorts of contexts including business, education, and personal computer use. In addition, such uses by all current predictions appear to be even more desirable in the future. Video on demand ("VOD") is one area which has for some time driven the advancement of technology in this area. More recently, the rapid increase in use and popularity of the Global Internet (hereafter, the "Internet") has perhaps surpassed the excitement created by VOD. This Internet focus also has further motivated research and preliminary development of systems directed to advanced communication of information between remotely located computers. These factors as well as the continuing evolution of computer information exchange gives rise to the present embodiments.

One type of technology arising from the above and continuing to evolve is referred to in the art as digital subscriber line ("DSL"). DSL is a public network technology that delivers relatively high bandwidth over conventional telephone company copper wiring at limited distances. As explored below, DSL has been further separated into several different categories. All of these differing DSL categories are currently developing, some at different rates than others. In any event, the evolution prevents an absolute definition of any specific DSL category, but some observations may be made at the current time and are explored below.

Given the various DSL technology categories, it may be stated that each differs in some respects while each also shares some similarities. As to differences of the DSL categories, they may diverge in one or more of the expected data transfer rate, the medium type and length over which data are communicated, and the scheme for encoding and decoding data for communication. As to the similarities of the DSL technologies, generally speaking each DSL system is provisioned into modem pairs. One modem of the modem pair is located at a customer site. The other modem of the modem pair is located at the site of an owner, or controller, of a twisted conductor pair network. Currently, the most evident owner or controller is a telephone company central office. Within the telephone company system, its modem is connected to communicate with some type of network, often referred to as a backbone network. The backbone network is further coupled in a network manner to provide other communication paths to and from the backbone network. These other paths are often accomplished through the use of routers, and more recently it has been proposed to eliminate routers in favor of a hardware device referred to as a digital subscriber line access multiplexer ("DSLAM"). In any event, given its network nature, the backbone network may further communicate with other information sources and, most notably under current technology, with the Internet Thus, information accessible to the backbone network, such as Internet information, may be communicated between the central office DSL modem and a customer site with its own compatible DSL modem. Within this general system, it is also anticipated that data rates between DSL modems may be far greater than current voice modem rates. Indeed, current DSL systems being tested or projected range in rates on the order of 500 Kbps to 18 Mbps, or even faster. As explored briefly below, however, note that the higher rates for some DSL systems are only for so-called downstream communications, that is, from the central office to the customer site; thus, for those systems, communication in the other direction (i.e., upstream from the customer site to the central office) is generally at a rate considerably lower than the downstream rate. Lastly, note that most DSL technologies do not use the whole bandwidth of the twisted pair and, thus, often reserve low bandwidth for a voice channel. As a result, while a line is being used by a DSL system, the same line may concurrently communicate a voice conversation as well.

Briefly looking at perhaps the most publicized DSL technology currently being developed, it is referred to as Asymmetric Digital Subscriber Line, or "ADSL." ADSL has been standardized by ANSI as seen by its T1.413 standard. However, even given that standard, there continues to be debate and competition as to whether devices complying with the standard provide promise for future wide scale use, and indeed whether the standard requires revision. For example, the standard currently contemplates a modulation technology called Discrete Multitone (DMT) for the transmission of high speed data, but more recently it has been urged that the standard further include an alternative data transmission technique referred to as carrierless amplitude/phase modulation (CAP). In any event, given the state of the art discussion of ADSL systems, it is contemplated that they will communicate over a single copper twisted pair, and provide downstream rates on the order of 1.5 Mbps to 9 Mbps, while upstream bandwidth will range from 16 kbps to 640 kbps. Along with Internet access, telephone companies are considering delivering remote local area network ("LAN") access and VOD services via ADSL.

As to other DSL categories being developed, they include High-Bit-Rate Digital Subscriber Line ("HDSL"), Single-Line Digital Subscriber Line ("SDSL"), and Very-high-data-rate Digital Subscriber Line ("VDSL"). HDSL, unlike ADSL as described above, has a symmetric data transfer rate, that is, it communicates at the same speed in both the upstream and downstream directions. Current perceived speeds are on the order of 1.544 Mbps of bandwidth, but require two copper twisted pairs. HDSL's operating range is more limited than that of ADSL, and is currently considered to be effective at distances of approximately 12,000 feet Beyond sudi a distance, HDSL communication requires signal repeaters to extend the service. SDSL delivers a comparable speed and also a symmetric data transfer as compared to HDSL, but achieves these results with a single copper twisted pair. However, the operating range of an SDSL system is limited to approximately 10,000 feet. Lastly, VDSL provides asymmetric data transfer rates, but anticipates much higher speeds than those competing DSL technologies described above. Currently, rates over a single twisted copper pair on the order of 13 Mbps to 52 Mpbs downstream, and 1.5 Mbps to 2.3 Mbps upstream, are contemplated. Note, however, that such rates are expected to operate only over a range of 1,000 to 4,500 feet.

Despite the many variations of DSL technology as introduced above, it has been recognized in connection with the inventive embodiments described below that many of the prior art approaches provide various drawbacks. For example, many of the attempted implementations for current DSL technologies are heavily constrained in hardware. More specifically, often these implementations are achieved through an application specific integrated circuit ("ASIC") or more than one ASIC. Thus, if a standard has not yet been announced, or if a standard changes as may be the case even for those standards currently in place, the ASIC may be rendered useless if it will not accommodate the new or changed standard. As another example, there is a need for DSL technologies to be easily and readily compatible with existing personal computer and workstation architectures and operating environments. As another example, many of the contemplated systems require considerable complexity for implementation. Such complexity may provide numerous drawbacks. For example, complexity may slow the implementation and continuing development of the technology. As another and perhaps most important example for a technology having such broad potential dissemination extreme complexity may increase the cost of implementing the technology to an unacceptable level.

By way of further introduction, it is currently contemplated that DSL modems may be connected to various computers in various fashions. One manner being considered is locating the modem internally in a personal computer or the like, but such an approach therefore likely requires various levels of compatibility between the modem and the computer. One particular level of interest to the embodiments described later is compatibility with the computer operating system. For example, under the current WINDOWS operating system by MICROSOFT, much of the driver and software layer starting from the application program and down to the device driver layer associated with the hardware is based on prior art devices which communicate only in a symmetric manner, that is, data transfer rate is the same both to and from the modem. However, as mentioned above, DSL technology includes asymmetric transfer rates. Thus, numerous drawbacks also arise from the corresponding instances where the upper software layers anticipate communications to be symmetric or at least to appear to those layers to be symmetric, while in fact permitting asymmetric communications at the hardware and device driver layers.

Given the above, the present inventors set forth below various inventive embodiments which seek to overcome the discussed drawbacks as well as others which may be ascertained by one skilled in the art

BRIEF SUMMARY OF THE INVENTION

In one embodiment, there is a computer system comprising a first DSL modem for communicating data packets with a second DSL modem after a connection is established between the first DSL modem and the second DSL modem The data packets are for communication from the first DSL modem to the second DSL modem at a downstream communications rate and for communication from the second DSL modem to the first DSL modem at an upstream communications rate. The computer system further comprises a memory operable to store a computer program, where in one embodiment this computer program is an operating system The computer program is operable to require a data parameter indicating a number of data packets which may be communicated in an instance from the computer program to the first DSL modem for communication to the second DSL modem. Lastly, the computer system further comprises a field for providing the data parameter to the computer program, wherein the number of data packets is responsive to the ratio of the downstream communications rate relative to the upstream communications rate.

BRIEF DESCRIPTION OF THE SEVERAL VIEWS OF THE DRAWING

FIG. 1 illustrates a telecommunications systems implementing a first digital subscriber line ("DSL") modem in a corresponding host computer at a remote location and a second DSL modem in a corresponding host computer at a central location having access through a network to the global Internet;

FIG. 3 illustrates the preferred relationship of frames and messages;

FIG. 4 illustrates the preferred format for a user message; and

DETAILED DESCRIPTION OF THE INVENTION

Figure 2:
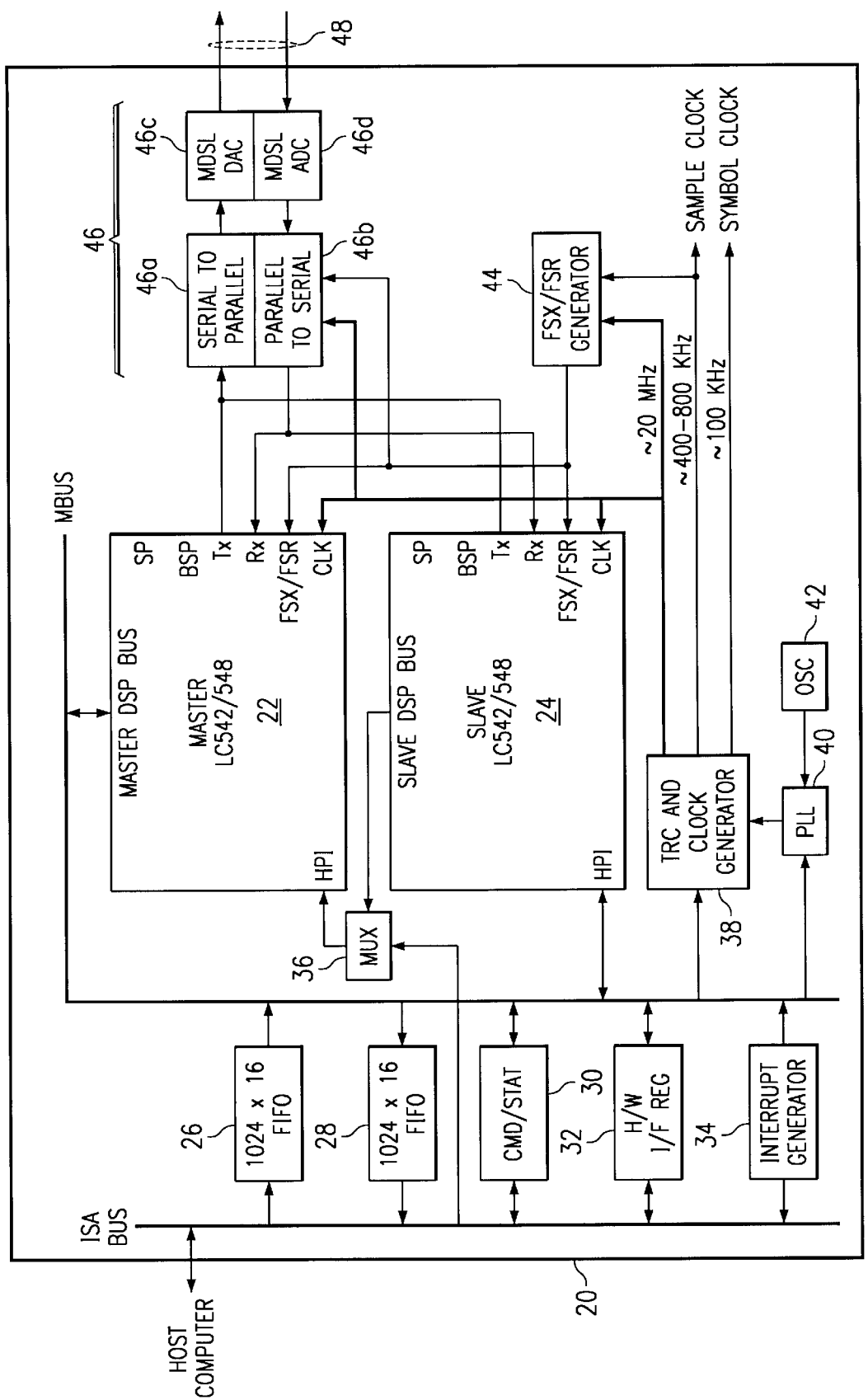
FIG. 2 illustrates a block diagram of a DSL modem card.

FIG. 1 illustrates a system 10 depicting by way of example the context in which the present inventive embodiments may be implemented. By way of example, system 10 includes aspects which relate to two different geographic locations, one being a telephone company central office and the other being a location remote from that office and, hence, referred to in this document as a remote location. For purposes of appreciating a common example, the remote location may be a home or office of a user in that location while the central office may be any of those types of offices included in a telephone company system. Stated simply, therefore, these two locations may be fairly dose together, or vast distances apart, yet they both may benefit from the present embodiments. These benefits as well as the details of the inventive embodiments are presented below.

At a minimum for illustrating the preferred embodiments, each of the central office and remote location houses a computer 12 and 14, respectively. Computers 12 and 14 may be of any type of known computer configurations and, indeed, the type of computing device at the remote location may well differ from the type or configuration of that used at the central office (e.g., a rack system). Typically, therefore, a user of either computer may provide input to a corresponding computer, such as by way of a keyboard K and a mouse MS or other input or pointing device as known in the art. To simplify the present illustration, note for purposes of FIG. 1 that each of the reference identifiers for these items (i.e., K and MS) as well as for other items discussed below further includes a subscript reciting the reference number of the corresponding computer. For example, computer 12 includes keyboard $K_{12}$ and mouse $MS_{12}$. Continuing with this convention and looking to other attributes of computers 12 and 14, each computer preferably includes some device for presenting output to a user, such as a display D in the case of FIG. 1. Internally to each computer may be various circuits including those mounted on circuit boards and/or cards, including a motherboard (shown in phantom) which includes a memory MEM, a central processing unit CPU or more than one such CPU as may likely be the case for host computer 12, and likely other circuitry (not shown). Of particular note to the present embodiments, also included preferably internal to each computer and, thus, shown in phantom, is a modem M so that each of computers 12 and 14 may communicate with one another over a standard telephone company distribution system. In the case of host computer 12, note that it is likely to actually include and support multiple modems, although only one is shown to simplify the illustration as well as the following discussion. Looking to the distribution system along which the modems communicate, it includes twisted conductor pairs accessible for a connection between computers 12 and 14. In this regard, modem $M_{14}$ of computer 14 provides an output which is provided to a standard telephone or other applicable connector and, thus, is connected to a telephone wall outlet $O_{14}$ via a standard telephone communication cable $C_{14}$. This connection permits communication from modem $M_{14}$ over the telephone company distribution system and, therefore, with modem $M_{12}$ of computer 12. Note that while comparable connections using cable $C_{12}$ and outlet $O_{12}$ are shown at the telephone company, more typical industrial type connections may actually exist at that end of the connection. Lastly, given the communications of modems $M_{12}$ and $M_{14}$ with one another, note that in the preferred embodiment such communications are by way of a DSL category referred to as Medium-bit-rate Digital Subscriber Line (MDSL) technology, which currently contemplates downstream communications up to 2.8 Mbps and upstream communications up to 768 Kbps. One skilled in the art, however, will appreciate that many of the present teachings also provide aspects and benefits which may be implemented in other DSL categories.

Given system 10 of FIG. 1, it is intended that its components are used within the present inventive scope to accomplish DSL communications between modems $M_{12}$ and $M_{14}$. In this regard, note that computer 12 is connected via an appropriate interface I/F to a backbone network. This network may be of various types, with Ethernet being a popular contemporary example. As a result, computer 12 may communicate with any other device or resource which also is coupled to communicate with the backbone network. Indeed, as one example, FIG. 1 illustrates that the Internet is also coupled to the backbone network through some kind of networking architecture. Consequently, computer 12 may communicate, via the backbone network, with the Internet. Additionally, due to the modem-to-modem communication path between computers 12 and 14, computer 14 may use DSL communications for accessing other media available to computer 12 at the telephone company central office.

FIG. 2 illustrates a block diagram of a computer card modem 20 serving as the preferred embodiment for forming modems $M_{12}$ and $M_{14}$, with it understood under the preferred embodiment that a modem located at a remote site such as modem $M_{14}$ further includes sufficient circuitry for timing recovery while such circuitry is not included on a central office modem such as modem $M_{12}$. Turning now to the specific illustration of FIG. 2, modem 20 includes a first digital signal processor ("DSP") 22 and in the preferred embodiment includes a second DSP 24 as well. Currently, DSPs 22 and 24 are implemented as device numbers TMS320LC542 or TMS320LC548 commercially available from Texas Instruments Incorporated. However, it is contemplated that other DSPs may be used, and further that a single DSP may indeed be sufficient for alternative embodiments. Returning to the embodiment of FIG. 2, DSPs 22 and 24 are configured in the microcomputer mode where, in that mode, the internal memory of each DSP is divided to include 2 K words of program memory and 10 K words of program/data for the TMS320LC542, or to include 2 K words of program memory and 32 K words of program/data for the TMS320 LC548. The division of the 10 K or 32 K words between program and data is programmable. Further with respect to DSPs 22 and 24, when implemented using the TMS320LC542 they are configured in a master/slave configuration, with DSP 22 serving as the master and DSP 24 serving as the slave. Where the TMS320LC548 is used, only that single DSP is used and, thus, no master/slave relationship exists. From this point forward, however, by way of example the TMS320LC542 will be discussed by way of example and, therefore, these DSPs are referred to as master DSP 22 and slave DSP 24. Master DSP 22 has access to all the peripheral circuits on modem 20 and also controls the operation of slave DSP 24. Additionally, in the preferred embodiment, a DSL algorithm for communicating data according to a DMT algorithm is implemented in master DSP 22, while a DSL algorithm for communicating data according to a CAP algorithm is implemented using both master DSP 22 and slave DSP 24.

Looking generally to the left of FIG. 2, modem 20 includes an industry standard architecture ("ISA") bus which provides the interface of modem 20 to a corresponding computer. In the preferred embodiment, the ISA bus is a accessed by way of a single full-sized 16 bit bus as typically available within an IBM compatible computer. Thus, modem 20 may be inserted into the full size slot having access to this ISA bus, and perform the functionality and interaction with the corresponding computer as described throughout this document. Given this connection and that modems $M_{12}$ and $M_{14}$ are preferably implemented in this computer card fashion for internal installation into a corresponding computer, by way of convention for the remainder of this document the corresponding computer is referred to as a host computer with respect to its corresponding modem. Thus, in the example of FIG. 1, each of computers 12 and 14 is hereafter referred to as a "host" with respect to its corresponding modem $M_{12}$ and $M_{14}$. Similarly, since modem 20 is illustrative of either modem $M_{12}$ and $M_{14}$, it should be understood that when the host computer is referred to with respect to modem 20, it is intended to apply to that computer which corresponds to a particular use of modem 20. In any event, returning now to the particular structure of modem 20, the ISA bus communicates with various circuits, each of which is discussed below.

Two similar circuits communicating with the ISA bus include a FIFO 26 and a FIFO 28. The difference between FIFOs 26 and 28 is in the direction of the data path between the ISA bus and an internal modem bus designated the MBUS. In the preferred embodiment, each of FIFOs 26 and 28 is operable to store up to 1024 binary quantities, where each quantity is 16 bits wide. In operation, these quantities represent DSL data communicated from the host computer to modem 20 in the case of FIFO 26, and from modem 20 to the host computer in the case of FIFO 28. In other words, once a connection is established as detailed later, the host computer may transmit DSL data via the ISA bus to FIFO 26, and that data is then ultimately communicated from modem 20 to a remote modem at another site. In a similar manner, when modem 20 receives DSL data from a remote site, it is communicated via the ISA bus to the host computer by presenting it in appropriate size quantities to FIFO 28.

The ISA bus is further connected to a command/status register 30 (abbreviated as CMD/STAT in FIG. 2) which is a general purpose 16 bit bi-directional register. The number of storage entities of command/status register 30 may be chosen so as to accomplish the functionality described in this document below, as well as any other functionality as may be implemented by one skilled in the art. In the preferred embodiment, this functionality includes the passage of commands from the host computer to modem 20, but in an alternative embodiment may further include the passage of commands from modem 20 to the host computer. The information stored in command/status register 30 also reports various status information from modem 20 to the host computer. In this regard, in the preferred embodiment the bits of command/status register 30 are not dedicated, but instead, they are loaded by master DSP 22 in response to a request from the corresponding host computer. In other words, at any given point, a particular bit in command/status register 30 may represent one type of information in response to a request, while at another point the same bit may represent a different type of information. In any case, these various types of information are preferably maintained in software by master DSP 22 for reporting to command/status register 30, and include a ringing/dialing bit, an acknowledgment bit, a ring-back bit, status bits, and a connection bit/Lastly, command/status register 30 may be used to download the executable code for master DSP 22 from the host computer.

The ISA bus is further connected to a hardware interface register 32 (abbreviated H/W I/F REG in FIG. 2), which is a general purpose 16 bit bidirectional register and has a sufficient number of entries for storing two types of interface information. The first type of information stored in hardware interface register 32 permits a handshaking between modem 20 and its host computer. This information includes two bits, one corresponding to the host computer and the other corresponding to modem 20. Each of these bits is set by the corresponding device either while or after it sends a command, and is reset by the receiving device once that device receives the command. For example, a first one of these bits may be set by the host computer when it issues a command to command/status register 30 and directed to modem 20, and then modem 20 will reset that same bit once it reads the sent command from command/status register 30. The second type of information stored in hardware interface register 32 indicates an approximate level of the quantity of data stored in FIFOs 26 and 28. In the preferred embodiment, these levels are set at full, empty, or half-full. Thus, this information may be obtained by either modem 20 or its host computer to coordinate the communication of DSL data between the two.

The ISA bus is further connected to an interrupt generator 34. In the preferred embodiment, interrupt generator 34 is operable to receive a control signal from modem 20 via the MBUS and in response to that signal to issue an interrupt to the host computer via the ISA bus. Note, however, that in an alternative embodiment interrupt generator 34 is operable to provide an interrupt in the opposing direction, that is, an interrupt may be commenced by the host computer writing a command to command/status register 30 to trigger an interrupt to modem 20 via the MBUS. Returning briefly to the preferred embodiment, an example of the use of interrupt generator 34 occurs in the receipt of DSL packet data by modem 20 from another modem. More particularly, when such packet data is received by modem 20, it writes an identifier to command/status register 30, and it also issues a control signal to interrupt generator 34 which in turns presents an interrupt to the host computer via the ISA bus. At this juncture, therefore, and in response to the interrupt, the host computer reads the identifier in command/status register 30 to determine what caused the corresponding interrupt, and in the present case to determine that DSL packet data has arrived in modem 20.

As a final connection relating to the ISA bus, note that it provides an input to a multiplexer 36 (abbreviated "MUX" in FIG. 2) which has an output connected to the host port interface ("HPI") of the master DSP 22. This connection permits the host computer to write to the internal random access memory ("RAM") of master DSP 22 and, in this regard, the written information may include the executable code for operation of master DSP 22. While discussing multiplexer 36, note that it has a second input connected to the data output of slave DSP 24. Due to this connection, slave DSP 24 also may write to the internal RAM of master DSP 22 and, once again, the written information may include executable code for master DSP 22. Completing the discussion in this regard, note lastly that the data output of master DSP 22 is connected to the MBUS, and the MBUS is connected to the HPI of the slave DSP 24. Thus, as a final observation, master DSP 22 may write to the internal RAM of slave DSP 24, where that written information may include executable code for slave DSP 24.

Modem 20 further includes various circuitry related to operational timing. In this context, modem 20 includes a timing recovery and dock generator 38, a phase lock loop 40, and an oscillator 42. Accordingly, oscillator 42 provides a reference signal to phase lock loop 40, thereby providing a further control signal to timing recovery and clock generator 38 which is a programmable clock generator integrated circuit. In response, timing recovery and clock generator 38 provides a first timing signal to the clock inputs of DSPs 22 and 24, and also provides reference signals (shown as the Sample Clock and the Symbol Clock) to a serial timing signal generator 44 associated with DSPs 22 and 24 and for use by other circuitry (not shown).

Concluding FIG. 2, modem 20 includes an analog front end ("AFE") 46. AFE 46 includes the necessary circuitry for communicating DSL frames between modem 20 and a conductor pair 48. From the context of FIG. 1, note that conductor pair 48 of FIG. 2 is representative of a part of the telephone company distribution system which therefore permits modem 20 to communicate with a compatible modem. Thus, if modem 20 of FIG. 2 is thought of as modem $M_{14}$ in FIG. 1, then conductor pair 48 permits modem 20 to communicate with modem $M_{12}$ in the telephone company central office. Looking to AFE 46 in more detail, note that DSPs 22 and 24 communicate DSL frames (either sending or receiving) through a buffered serial port (abbreviated on each DSP as BSP in FIG. 2). Thus, AFE 46 includes a serial-to-parallel converter 46a for converting serial information communicated from either DSP to a parallel format, and further includes a parallel-to-serial converter 46b for converting parallel information to serial information for presentation to the BSP in either DSP 22 or 24. Additionally, AFE 46 includes a digital-to-analog converter 46c for converting the parallel data from serial-to-parallel converter 46a to a form suitable for transmission to twisted pair 48, and further includes an analog-to-digital converter 46d for converting the data from twisted pair 48 to a form suitable to present to parallel-to-serial converter 46b. Although not shown, it should be understood that AFE 46 further includes a sufficient connector or hardware interface to connect twisted pair 48 to modem 20, where various types of such devices are ascertainable by one skilled in the art.

Given the hardware descriptions set forth above, reference is now turned to various software functionality as is implemented in connection with the computer/modem interface with respect to both modems $M_{12}$ and $M_{14}$ introduced above. For modem 20, in the preferred embodiment this software interface occurs through the ISA bus, that is, it is through this interface that software communication may occur between a host computer and its modem. In other words, the preferred embodiment provides a software communication interface between the computer hardware for either of computers 12 and 14 (e.g., CPU or some other host computer controller) and the one or more DSPs on the corresponding modem card. Under the preferred embodiment, each host computer is programmed, such as through software which may be read into the memory of the computer, to issue appropriate communications to its corresponding modem. Also under the preferred embodiment, each modem 20 is programmed, such as through software in its DSP internal memory described above (or in an external memory in an alternative embodiment), to properly respond to the communication from its corresponding host computer. For purposes of the present document, therefore, such an interface is considered a host interface. Using this software interface, communications may occur between (i.e., in either direction) a given host computer and its corresponding modem. More particularly, note from the above illustration of FIG. 2 that such communications are preferably accomplished by having the host computer issue a command to command/status register 30 of its modem 20, and modem 20 in response to a command may return values such as status information to command/status register 30. Other communication techniques, however, are as certinable by one skilled in the art, such as by providing a value(s) from one of the DSPs to the ISA bus or some other communication medium between the modem and its host computer. Lastly, the preferred host/modem interface instigates various other inventive functionality performed by a modem, where that functionality is discussed below and particularly beneficial in the context of DSL operation as in the context of FIG. 1.

The computer/modem interface of the present embodiments may be considered to encompass three different categories of functionality. A first category relates to control communication between a host computer and its modem. A second category relates to what is referred to in this document as line connection management. At this point, note generally that line connection management functionality relates to establishing a connection between a first DSL modem and a second DSL modem accessible to the first DSL modem by a conductor pair. A third category relates to the actual transmitting and receiving of data packets between modems. For purposes of the present document, the focus of the remaining discussion is directed to the third category, while the first and second categories are discussed in the above-incorporated now abandoned U.S. patent application Ser. No. 09/000,899 with additional detail left to one skilled in the art.

Turning to the functionality of transmitting and receiving of data packets between modems $M_{12}$ and $M_{14}$ of host computers 12 and 14, respectively, the present embodiments implement functionality which may be considered for convenience at two different levels, a first being at the physical layer of the modem and a second being at the layer including the modem device driver. Each of these layers is discussed below.

The physical layer is the physical path which provides an electrical communication path established between the modems. Thus, in FIG. 1, the physical layer includes the hardware interfaces at modems $M_{12}$ and $M_{14}$, and the entirety of the conductive path between the two. This physical layer is connected at any time that an electrical signal of any type may be communicated along this path and the two peers are synchronized. Conversely, this physical layer is disconnected when there is some type of discontinuity (i.e., open circuit) in this path, or when two peers are not synchronized. Additionally, DSL communications are synchronous communications; thus, once the physical layer is connected, under the preferred embodiment there is then communication of mere filler data (as opposed to DSL user data or DSL system data as detailed later) between modems $M_{14}$ and $M_{12}$ so as to maintain timing.

To further appreciate the physical layer and communication along it, attention is now turned to the formatting of information passed between modems $M_{14}$ and $M_{12}$ along that layer. Specifically, FIG. 3 illustrates the fundamental unit of information of communications between modems $M_{12}$ and $M_{14}$. This fundamental unit of information is the frame. In FIG. 3, nine frames are shown with each having a designation "F" plus a subscript indicating its ordering in the sequence of frames (i.e. $F_1$ through $F_9$). The frame is described as the fundamental unit of communication because it is the base group or block of information communicated between modems $M_{12}$ and $M_{14}$, and thus various larger communications are made up of one or more frames. Each frame in the same direction of communication (i.e., either upstream or downstream) includes the same number of bits. However, the number of bits for downstream frames is contemplated as considerably higher than the number of bits for upstream frames. In addition, for either upstream or downstream frames, in the preferred embodiment the number of bits is a multiple of a fixed number (e.g., a multiple of 16 bits). The specific number of bits included in a frame in the preferred embodiment is determined based on the signal to noise ratio (SNR) of the line of communication between modems $M_{12}$ and $M_{14}$, but for purposes of the present embodiments the particular details of this determination need not be set forth. Instead, one skilled in the art should appreciate that the frame represents a fixed length unit for a given period and direction of communications, and since the other information units are composed of frames it should be appreciated that the frame boundaries also define the beginning and end of those other units. Additionally, by way of example, note that under MDSL technology as presently contemplated, a downstream frame includes a maximum of 44 words with each word being 16 bits (i.e., 704 bits), while an upstream frame includes a maximum of 12 words of 16 bits each (i.e., 192 bits). Lastly, DSL communications are synchronous communications; thus, once the physical layer is connected, under the preferred embodiment there is always a continuous stream of frames being communicated along the downstream path from modem $M_{12}$ to $M_{14}$, and also once the physical layer is connected there is likewise always a continuous stream of frames being communicated along the upstream path from modem $M_{14}$ to $M_{12}$. Consequently, when neither user nor system (e.g., control) data is being communicated, these frames are mere filler data. In any case, the continuous flow of frames provides a basis for timing in the synchronous system, and in the preferred embodiment are also used for error correction as detailed in the above-incorporated U.S. patent application Ser. No. 09/109,340.

Above the frames in FIG. 3 are shown a sequence of three messages, using the designation "MG" plus a subscript indicating an ordering in the sequence of messages (i.e. $MG_1$ through $MG_3$). At this point the illustration of FIG. 3 is intended to show the relative nature of frames as they combine to form messages. In FIG. 3, therefore, frames $F_1$ through $F_3$ are used to form message $MG_1$, frames $F_4$ through $F_6$ are used to form message $MG_2$, and frames $F_7$ through $F_9$ are used to form message $MG_3$. In the preferred embodiment, all messages start and end on a frame boundary, although some of the information at the end of a message may be mere "don't care" information to extend the length of the message so that it indeed ends on a frame boundary. In addition, the number of frames per message depends on the type of message, where such message types are detailed below. At this point, note by way of introduction that these message types include user messages (which include packet data), and further include system messages and filler messages which are described briefly in this document for the sake of completion. In the currently preferred embodiment, user messages include a variable number of frames, where the maximum number of frames is limited by a byte length field described below with respect to FIG. 4. However, in an alternative embodiment the user messages could have a fixed number of frames. Indeed and in a similar regard, in the preferred embodiment and in contrast to the preferred variable-length user message, both system messages and filler messages consist of a fixed number of frames. More particularly, the fixed number of frames in a system message depends on the type of system message, and filler messages are fixed in size such that each filler message is one frame in size. Lastly, recall that the frame size for downstream communications is considerably larger than the frame size for upstream communications. By the above definition relating frames to messages, therefore, the one message with three frames from modem $M_{12}$ to modem $M_{14}$ provides considerably more bits than the one message with three frames from modem $M_{14}$ to modem $M_{12}$. It is in this manner that the effective overall rate of bits communicated is larger for downstream communications as compared to upstream communications.

Having demonstrated the general format of messages and their relationship to frames, a discussion is now provided by way of context as to the use of messages to communicate various matters between modems $M_{12}$ and $M_{14}$. In general, recall from the previous introduction that there are three types of such uses and, thus, these types may be thought of as defining three types of corresponding messages. These three types of messages are filler messages, user messages, and system messages. Each of these messages is described below, and for still additional detail the reader is referred to the above-incorporated U.S. patent application Ser. No. 09/109,340.

Filler messages are named as such because they provide filler data between modems $M_{12}$ and $M_{14}$ as introduced earlier. Thus, during a time when neither user nor system messages are being communicated in a given direction between modems $M_{12}$ and $M_{14}$, then each message is a filler message communicated generally to maintain timing/message synchronization. As a result, when a modem receives a filler message and detects it to be such a message, it need not inform its host computer or otherwise remove any data from that message for communication onward to any software layer within that host computer. However, as detailed in the above-incorporated U.S. patent application Ser. No. 09/109,340, the filler message is also preferably used for error elimination; thus, actions by the modem are taken in connection with filler messages for error elimination, but preferably these actions are independent of and without disturbing the corresponding host computer.

User messages are named as such because each user message includes user data, where that user data includes so-called packet data which is transmitted to the physical layer from a data link layer according to a protocol. For example, the protocol may be the well-known Point-to-Point Protocol ("PPP"), or others as may be ascertained by one skilled in the art. In any event, this data link layer is a higher layer in the host computer as is detailed below with respect to FIG. 5. For purposes of this document, user (or packet) data may be best described by way of examples. For instance, when a user of computer 14 is reviewing e-mail received from computer 12, then the text of that message is user data. As another example, when a user of computer 14 is browsing the Internet from communications from computer 12, then the graphical interface (including text) is also user data. Stated simply, therefore, user data is typically data which is intended for meaningful presentation to the user, or is sent by the user to the Internet or some other recipient for presentation or some other common use of such information. As mentioned above, user messages in the preferred embodiment include a variable number of frames. More specifically in this regard, in the preferred embodiment the data from a single packet of data from the data link layer is inserted at the physical layer of the modem into a single user message. The preferred format of such a message is described below with respect to FIG. 4. Thus, the host computer provides to the modem a number of bytes as a single packet of data, and the modem in turn formats this data into a single message which includes the data as well as certain overhead information discussed below. Lastly, note in the preferred embodiment that typical PPP data packets are limited to a length of no more than 1532 bytes per packet, but in some embodiments there may be a provision by which a negotiation between the modems may request and grant a limit greater than the limit of 1532 specified above.

System messages are generally those which are neither filler data nor user data as defined above. In this regard, the above-referenced, now abandoned U.S. patent application Ser. No. 09/001,125 provides extensive detail regarding various examples of instances where a host computer issues a command to its corresponding modem, and the modem responds by sending what is referred to only as a "message" in the patent to the other modem to which it is connected. As one example from the incorporated patent, once a connection is established between modems, a host computer may issue a DropConnection command to its modem The DropConnection command arises when an application program issues a request to end a connection to a modem driver, and the driver in response issues the DropConnection command to the corresponding modem. In response to the DropConnection command, the modem transmits a corresponding drop connection message to the other modem to which it is connected. This corresponding drop connection message is an example of a system message. Many others are in the incorporated in the above-incorporated patent application Ser. No. 09/001,125, and still others will be ascertainable by one skilled in the art FIG. 4 illustrates the preferred format for the user messages described above. In general there are two categories of information in each user message, those being either overhead or data. Looking briefly to each, the message overhead includes two header words $HEADER_1$ and $HEADER_2$, as well as a checksum/CRC word $CC_1$. For purposes of the preferred embodiment, a word is defined as 16 bits; thus, each of these overhead quantities is preferably a 16 bit quantity. In the preferred embodiment, header words $HEADER_1$ and $HEADER_2$ are identical, that is, assuming proper operation and no errors then header word $HEADER_2$ is merely a repetition of header word $HEADER_1$. This allows the software receiving the message to verify the message control information. Particularly, when the message is received, a modem within the present inventive scope compares header words $HEADER_1$ and $HEADER_2$ with one another and deems an error in the message if the two header words do not match.

As further shown by an expanded view in FIG. 4, each of header words $HEADER_1$ and $HEADER_2$ includes three fields, consisting of a flow control flag ("FCF") field, a message type field, and a data byte length field. The FCF field need not be discussed herein but the reader desiring additional information is invited to review incorporated by reference of U.S. Pat. No. 6,104,749. The message type field identifies that the message is a user message (or could identify it as a different type of message). The data byte length field (ie., bits 10–0) specifies the number of valid data bytes included in the same message which provides the header; thus, recalling that the user message is variable in length, it is now noted that the data byte length field specifies the actual length of a given user message. In addition, since the present embodiment includes a length field having 11 bits, then the maximum number of bytes for a single user message is 2047 bytes (i.e., $(2^{11})-1=2047$). Note that some messages do not include any valid data. In this case, therefore, the data byte length field indicates zero valid data bytes.

Looking to checksum/CRC word $CC_1$, it provides standard checksum and/or cyclic redundancy code information as known in the art; thus this information may be used for error detection upon receipt of an entire message. Concluding with the message data in FIG. 4, it may be used to carry either user data or parameters associated with a system message.

Having detailed the physical layer of modem communications in the preferred embodiment, attention is now directed to the layer including the modem device driver. By way of introduction to the preferred embodiment of the modem device driver, note that initially each host computer issues one or more commands to its modem to cause the modem to perform one or more start-up operations as part of the general control communication between host computer and its modem (i.e., the first category of interface introduced above). Briefly, such operations may include some type of reset and possibly some self-testing operations by the DSPs on the modem card. Next, one of various other commands may be issued from the host computer to the modem, thereby causing various corresponding functionality. Each of these commands is discussed in the above-incorporated U.S. patent application Ser. No. 09/000,899 now abandoned. In any event, one of these commands is preferably issued by the device driver from the host computer to its modem after the modem has performed its start-up operation(s) but also as part of the initialization of the host computer, and this command is a request pertaining to various line attributes which are desired for communication between modems $M_{12}$ and $M_{14}$. In response to this request, the modem receiving the request issues a corresponding line configure request message to the modem to which it is seeking to connect. Thus, by way of example from FIG. 1, if host computer 14 issues this command request to modem $M_{14}$, then modem $M_{14}$ issues a corresponding request message to modem $M_{12}$. In response, modem $M_{12}$ issues an interrupt via its interrupt generator 34 to its host computer 12, and it sets an interrupt code in its command/status register 30 which indicates that the interrupt was generated because a request message was received. In response, host computer 12 evaluates the request, and provides a response command to modem $M_{12}$, where that command identifies the line attributes which will govern from that point forward. In response, modem $M_{12}$ transmits these line attributes into a response message to modem $M_{14}$. Thus, the response message provides the acceptable line attributes to modem $M_{14}$. These line attributes may simply be the same as were requested, in which case the response may be considered a full grant. Alternatively, the line attributes stated in the response may be something less or different than what was requested. As yet another alternative, the response may deny the request in its entirety. The returned attributes from the response are initially stored by master DSP 22 of modem $M_{14}$ in software, and then may be placed in its command/status register 30 in response to a command from host computer 14. In addition, modem $M_{14}$ issues an interrupt to host computer 14 to notify it that a response has been received to the request Once the modem which requested the particular line attributes has received a response, it is further able to determine whether a connection is established between itself and the opposing modem. In this regard, for purposes of the preferred embodiment it should be understood that the requested attributes and the potential later connection relate to both the physical layer and a data link layer. The physical layer was introduced earlier and the link layer is further discussed immediately below.

The data link layer may be thought of as above the physical layer in the sense of layered communications as typically understood in the art. In addition, the data link layer represents that all parameters have been successfully established so that frames of DSL user data may be communicated along the connected physical layer. Thus, by way of example, the data link layer connection is only connected once timing and other related considerations detailed later are resolved between the modems. In this respect, in one embodiment only a single data link layer connection is implemented. However, in an alternative embodiment it is contemplated that multiple data link layer connections may exist for different applications (programs). In this alternative embodiment, therefore, one data link layer connection may be used for a first application program while a different data link layer connection is used for a second application program. Lastly, note that once a data link layer connection is established, there may be periods of DSL user data being communicated or idle periods. In either event, the line is fully connected and, thus, available for sending and receiving DSL user data (although newer DSL user data may require buffering if current data is being communicated).

Given the layering, it is further contemplated that modem 20 is able to report whether there is a node-to-node "connection" at the data link layer or below. Thus, there may be a connection or disconnection at the physical layer, and there may be a connection or disconnection at the data link layer. Moreover, this status is available for indication to an application program so that it is notified of whether it may proceed with a desired communication or whether it must await further steps to accomplish a connection.

Figure 5:
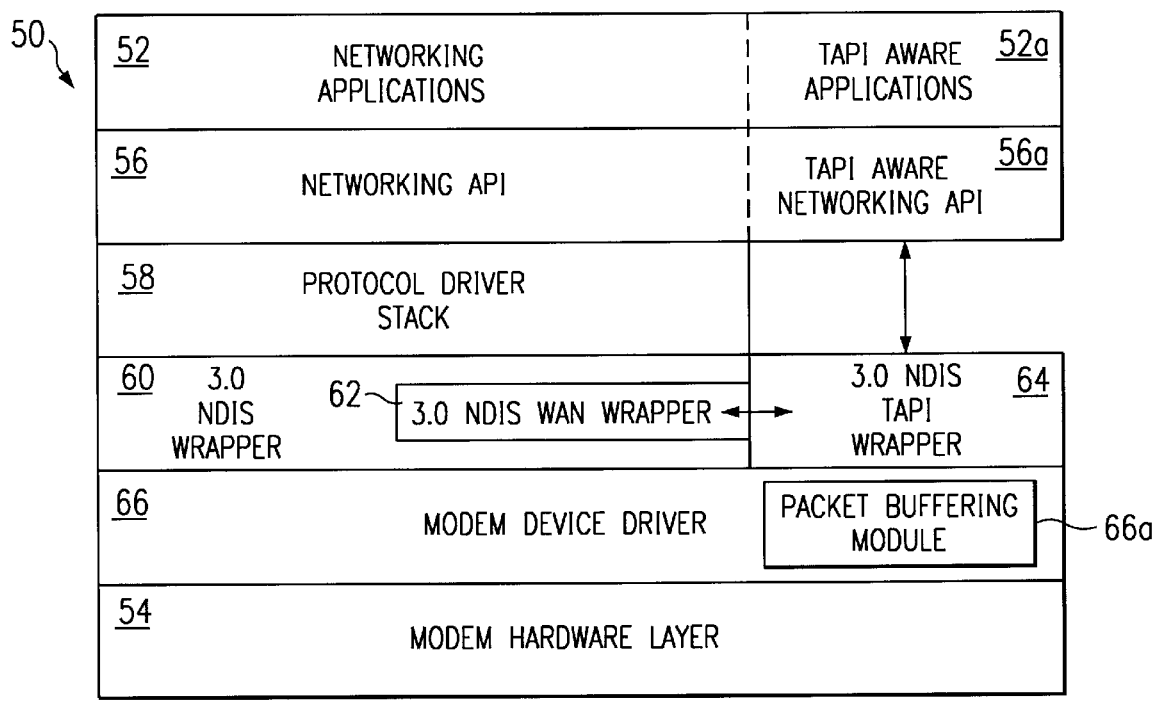
FIG. 5 illustrates a software layer for a computer implementing a DSL modem, including a device driver with a packet buffering module.

Having introduced various start-up operations as well as the notion of connectivity at both the physical and data link layers under the preferred embodiment, additional attention is now directed to the preferred approach for layering of software communications between the modem hardware and application programs, where this discussion furthers the functional descriptions set forth above. Turning then to FIG. 5, it illustrates a software layering diagram 50 within which the preferred embodiment is preferably implemented. At the outset, note that layering diagram 50 is representative of a software implementation which may be achieved on various personal computers, and using various operating systems. In the preferred embodiment, layering diagram 50 is implemented under a MICROSOFT WINDOWS systems, where current versions include MICROSOFT WINDOWS NT and MICROSOFT WINDOWS 95. However, one skilled in the art may apply much of the discussion of this document to other operating systems as well. For any of these systems the following discussion provides a preferred embodiment for software layering, where such layering supports either an internal or external installation of modem 20 of FIG. 2, and where the installed modem may operate in a compatible manner with many already-established requirements for other networking constraints, including those imposed on other type of networking software and hardware. In other words, the following discussion demonstrates how modem 20 may interact with various existing software levels without requiring considerable additional software or particularized driver functionality. This approach, therefore, sharply contrasts with various developing DSL modems where the manufacturers of such devices require considerable specialized hardware and software to support the operation of their devices for common computers such as personal computers.

As a matter of introduction to layering diagram 50, note that it includes layers pertaining to the preferred modem device driver of the present embodiments. In this regard, one aspect of the preferred embodiments arose in selecting the model for a device driver directed to a DSL modem and given current operating systems, with particular attention on the WINDOWS operating system and its lack of support for DSL modems. In other words, since DSL modems are not supported, a driver in accordance with the preferred embodiment must both support the DSL modem and further maintain compatibility with the operating system such as by rendering an appearance to the operating system that one of its known compatible models of communications are being used. Generally, four different models of communications were considered for such a driver. The first model is the traditional voice band modem which uses the COM serial port on a personal computer as an I/O port for its communications. The second model is a router device. The third model is LAN emulation. The fourth model is a WAN adapter implementing a WAN miniport device driver. After a complete analysis, the last of the four presented choices is selected in the preferred embodiment, as will be readily apparent from a more detailed analysis of FIG. 5 presented later. Before reaching that discussion, the first three presented choices are discussed below.

The traditional voice band modem which uses the COM serial port on a personal computer as an I/O port for its communications was removed from consideration for at least the following reasons. First, the COM serial port is designed for the asynchronous data transfer. However, DSL is a synchronous transmission device. Thus, if the COM serial port were used, it is contemplated that additional asynchronous data transfer control would be required and, as such, would place a large amount of overhead on the DSL system. Additionally, DSL communications are projected at data rates far greater than voice band modems. Lastly, it is contemplated that DSL modems will provide multiple channels, and these channels could require occupying multiple COM ports in the system, thereby presenting a potential future bottleneck to further DSL system development.

The router device was removed from consideration for at least the following reasons. A router by definition requires an additional hardware device, such as an Ethernet adapter. Thus, this requirement increases the overall cost of implementation, as well as the complexity. Additionally, a router implementation would add an additional layer of data packet packing/unpacking instead of using off the shelf software as in the WINDOWS system. This also increases cost and complexity.

The LAN emulation was removed from consideration for at least the following reasons. First, it is connectionless and, thus, has difficulty handling connection-oriented networks which include the types of connections implemented in DSL. Second, it does not include a built-in connection wrapper like the TAPI wrapper defined in WINDOWS and explored later in connection with the preferred embodiment. Third, the data framing contemplated for use in DSL (e.g., PPP) must be done either in the LAN driver or in firmware or hardware, thereby adding complexity and cost.

In contrast to the three preceding models, it is recognized in connection with the present embodiments that a WAN driver model may be followed so as to use existing WINDOWS provided system modules to permit the implementation of DSL communications in a relatively straightforward manner. This ability to achieve compatibility and provide an effective and affordable system should be appreciated from the following details of the preferred embodiment.

Layering diagram 50 at its top includes a networking applications layer 52. Layer 52 represents those types of application programs implemented on a computer (e.g., personal computer) to communicate with another computer via some type of network link. As examples, contemporary e-mail programs and Internet browser programs provide this type of functionality. These programs provide a user interface typically for performing at least three functions. First, the interface solicits user input for configuring user-alterable parameters associated with the network link. Second, the interface gives the user the ability to establish a networking connection, as well as the ability to terminate the connection. Third, the interface displays user data received from the network during the time the connection is established. Concluding the introductory discussion of layer 52, note that it is shown to include a portion represented as TAPI-aware applications 52a. This portion is intended to illustrate that certain application programs require seek to establish connections via TAPI standards and, thus, may be considered "aware" of those standards and will operate according to certain TAPI state transitions detailed in the above-incorporated U.S. patent application No. Ser. No. 09/000, 899 now abandoned.

Looking to the bottom of layering diagram 50, it represents a modem hardware layer 54. In the preferred embodiment, layer 54 is achieved using modem 20 of FIG. 2 as well as the electrical interface from that modem toward the network. While modem 20 is therefore preferred, one skilled in the art should appreciate that various alternative DSL modems may be implemented in layer 54. Thus, the remaining discussion provides details and examples of layering diagram 50 in the context of modem 20, but it is contemplated that other DSL modems also may be supported under the present teachings and therefore may fall within the inventive scope.

Between networking applications layer 52 and modem hardware layer 54 are various intermediate layers, where from the top downward, these layers include a networking API 56 and a protocol driver stack 58. One skilled in the art will appreciate that in general various communications from networking applications layer 52 to modem hardware layer 54 are performed through these layers 56 and 58. Although each of layers 56 and 58 is known in the art note the following as a brief description for purposes of context. Networking API 56 is provided in the WINDOWS operating system and, as its name suggests, defines an application programmer's interface through which any networking application program may communicate to perform network access and thereafter communicate with the accessed network. Additionally, note that FIG. 5 also depicts that networking API 56 includes a portion represented as TAPI-aware networking API 56a. Portion 56a illustrates that, for TAPI aware applications 52a, a portion of networking API 56 provides a functionality between those programs and a lower layer described below. Protocol driver stack 58 is also provided in the WINDOWS operating system or by third party vendors and provides various different known protocols, such that different networking application programs may use different ones of the protocols. For example, two common networking protocols included in stack 58 are the TCP/IP and UDP/IP protocols. Additionally, layer 58 is referred to as a stack because different portions of the stack may apply to different types of configurations.

Beneath protocol driver stack 58 are three wrappers that in certain respects may be perceived at the same layer level and, thus, a communication from protocol driver stack 58 toward modem hardware layer 54 may involve one or more of these three wrappers. These three wrappers are also provided in the WINDOWS operating system and, thus, are known in the art, and include a 3.0 NDIS wrapper 60, a 3.0 NDIS WAN wrapper 62, and a 3.0 NDIS TAPI wrapper 64. These wrappers form what is referred to in the art as the NDIS wrapper library. As a matter of further introduction with additional information ascertainable by one skilled in the art, note that the term wrapper is used in this context as generally indicating a layer which is added typically to prevent requiring another layer from having to be particularized if the wrapper did not exist In this regard, note that a modem device driver 66, detailed below, is beneath each of wrappers 60, 62, and 64. Thus, without wrappers 60, 62, and 64, modem device driver 66 would be required to communicate directly with protocol stack driver 58. However, it is has been observed in the art that often various different drivers use a common type of functionality to communicate with a protocol. Therefore, rather than requiring each different driver to include the same or similar functionality, it has been accepted as more efficient to move this common functionality into one or more wrappers. Wrappers 60, 62, and 64, therefore, serve this purpose as to the type of communication pertaining to each. With respect to these communication types, note that NDIS is an abbreviation for network device interface specification, and thus reveals further that wrappers 60, 62, and 64 are directed to different types of network communications, each of which is discussed below. Lastly, note that the indicator of 3.0 for each wrapper is merely a version identifier and, thus, much of the discussion herein applies to other versions (e.g., 4.0 NDIS wrapper, and so forth). Consequently, the 3.0 designation should not be interpreted as a limitation on the inventive scope and, from this point forward, it is dropped from the discussion.

NDIS wrapper 60 applies generally to so-called connectionless interfaces, as is often the case for local area network ("LAN") interfaces. The term connectionless indicates that once a device is physically interfaced with a computer, then there should be no additional requirement for a "connection" to be established to communicate data. In other words, the user should not be required to take subsequent actions and instead should thereafter be able to use a networking application to communicate data with the connectionless interface. One example of such a connectionless apparatus may be an Ethernet connection. Lastly, note that other connections may be made through NDIS wrapper 60 and, indeed, an arrow is shown between it and NDIS WAN wrapper 62 because, as known in the art, WAN connections instigated via NDIS WAN wrapper 62 are furthered by use of a communication from NDIS WAN wrapper 62 to NDIS wrapper 60.

NDIS WAN wrapper 62, as its name suggests, applies generally to wide area network (WAN) communications. WAN communications are connection oriented. Thus, communications via NDIS WAN wrapper 62 are in contrast to the connectionless interfaces described above, that is, once the physical interface of the particular hardware is achieved, a networking application program must take additional steps before communicating data via NDIS WAN wrapper 62. One example of such a connection may be a telephone dial in connection.

NDIS TAPI wrapper 64, as its name suggests, applies to TAPI communications. The preferred embodiment is compatible with TAPI in various respects as detailed in the above-incorporated U.S. patent application Ser. No. 09/000, 899, now abandoned and these compatible operations proceed through NDIS TAPI wrapper 64. More specifically, NDIS TAPI wrapper 64 includes a state engine which, from the beginning to end of a successful connection, requires advancement through its various states. Since TAPI involves telephony, these states may be appreciated in the context of typical voice calls. Briefly and by way of introduction, these states for an outgoing call include idle, dial tone, dialing, proceeding, ringback/busy, connected, and disconnected. For an incoming call, the TAPI states include idle, offering, accepted, connected, and disconnected. Accordingly, for proper compatibility, the layers communicating with NDIS TAPI wrapper 64 must comply with these states and, as shown in the above-incorporated U.S. patent application Ser. No. 09/000,899 now abandoned, the embodiment of that document permits such operation to occur for a so-called modem dial up mode operation, even though no actual dial up states occur given the nature of a DSL modem (e.g., which does not operate through typical telephony operations).

The remaining layer to be detailed in layering diagram 50 was introduced earlier in connection with an explanation of the term "wrapper," where that layer is modem device driver 66. In the preferred embodiment, modem device driver 66 is compatible with each of wrappers 60, 62, and 64, and thus by definition, supports communications between modem 20 (at modem hardware layer 54) and each of those wrappers.

More specifically, modem device driver 66 is implemented as a miniport driver since such a driver, by definition, is permitted to communicate with the NDIS wrapper library. The miniport modem device driver 66 uses a software object referred to as a logical adapter to represent the modem 20 located at layer 54. Thus, this logical adapter is available for access by the NDIS wrapper library, where access allows both reading and modification of the object. The logical adapter contains information describing the modem hardware, such as name, base address, and interrupt number. Additionally, the logical adapter includes information describing the current state of the driver in relation to the hardware resources used for sending and receiving user data. Still further, modem device driver 66 preferably supports further functions, including error handling, as well as a hardware interface and interrupt handling. Lastly and importantly for the present embodiments as will be apparent below, modem device driver 66 includes a packet buffering module 68a. Module 68a is shown as a separate function in FIG. 5 to facilitate the following discussion of the data structure it reports to the upper layers of diagram 50.

In the preferred embodiment, when a DSL connection is established (e.g., at both the physical and data link layers) an interrupt is generated from the physical layer to modem device driver 66. Since a connection has been established, then a rate of communication necessarily has been determined, such as by negotiation between the modems or selection based on factors such as channel characteristics or other criteria affecting the possible maximum rate of effective communication. In any event, at the time of the above-mentioned interrupt, the physical layer also indicates to modem device driver 66 the upstream and downstream data rates to occur from that point forward, or until some later time at which those rates may be changed as discussed below. Given this information, modem device driver 66 issues a call to NDIS wrapper 60. This call thereby indicates that a new data channel has been activated, and included within the call is a structure identifying various characteristics, where the structure is identified in this document as NDIS_MAC_LINE_UP and is represented for discussion sake by the following form:

typedef struct_NDIS_MAC_LINE_UP{
   IN ULONG LinkSpeed;
   IN NDIS_WAN_QUALITY Quality;
   IN USHORT SendWindow
   IN NIDS_HANDLE ConnectionWrapperID;
   IN NIDS_HANDLE NdisLinkHandle;
   IN OUT NDIS_HANDLE NdisLinkContext;
   } NDIS_MAC_LINE_UP, *PNDIS_MAC_LINE_UP;

Given this structure and the fields it includes, the field of note for purposes of the present embodiment is primarily the SendWindow field discussed below. Additionally, the reader is also referred to in the above-incorporated U.S. patent application Ser. No. 09/000,899, now abandoned which discusses the operation of modem device driver 66 in identifying a desirable link speed to the host, where that link speed may be inserted as the LinkSpeed field shown immediately above.

The SendWindow field arises from a specification by MICROSOFT and, thus, in included in the interface of at least one of the layers (i.e., "upper layers") in diagram 50 above modem drive driver 66. For example, in the embodiment of FIG. 5, the SendWindow field is implemented in protocol driver stack 58. In other configurations, however, the SendWindow field, or a field of comparable functionality, will exist in a layer between modem device driver 66 and networking applications 52. In any event, the SendWindow field indicates to the upper layer software the maximum number of data packets (i.e., one or more) which it may communicate to its modem for transmission, after which it must await an acknowledgment or the like before sending the next set of one or more data packets. If the upper layer software has more data packets for transmission than is permitted by this value, then it is the responsibility of the upper layer software to otherwise queue the additional data packets until a later time when it again can send the specified number of data packets to its corresponding modem Also in the prior art, this SendWindow field is contemplated for use by a device which often includes some type of hardware limitation that necessarily defines the value of the SendWindow field. For example, in an Ethernet card having a buffer sized to accommodate only up to five data packets, then such a card may have a corresponding device driver which sets the SendWindow field equal to this same limiting number (i.e., five). However, in the preferred embodiment, modem 20 is not limited in this manner and the SendWindow field is used in a different methodology, as detailed below.

In the preferred embodiment, modem device driver 66 maintains two packet queues for buffering data, where one is directed to transmitting data and the other is directed to receiving data. Also in the preferred embodiment, these queues are actually areas in memory which are reserved for storing packet data, although in an alternative embodiment these queues may be separate physical storage devices (e.g., FIFOs), or indeed may not be required if storage is available at the hardware layer which may store the packet data in a manner consistent with the functionality described below. Under some operations of the preferred embodiment, the SendWindow field may be set to one. However, in the preferred embodiment, the SendWindow field is increased with respect to the upper layer software which transmits in the downstream direction, whereas it is generally left equal to a value of one for the upper layer software which transmits in the upstream direction. Looking to the case of transmission in the downstream direction, in FIG. 1, therefore, this would refer to host computer 12 at the central office, which through its modem $M_{12}$ transmits in the downstream direction to host computer 14. More particularly, in the preferred embodiment the SendWindow field value is set to the integer portion of the ratio of the downstream communication rate to the upstream communication rate. For example, recall earlier that it is stated that MDSL technology currently contemplates downstream communications up to 2.8 Mbps and upstream communications up to 768 Kbps. Accordingly, the ratio of these two values is 2.8M:768 K, which is equal to 3.646:1. Thus, the integer portion of this ratio is 3, and consequently in the preferred embodiment the SendWindow field is set to 3 when the communications are at the 2.8M:768 K rate. As a final matter, note that the size of the queue for transmitting data also should be sized to accommodate the anticipated range of values for the SendWindow field so as to avoid an overflow of packets being sent to the queue for transmission.

Having described the selection of the value for SendWindow field based on the ratio of downstream to upstream communications, note now a few additional observations regarding that aspect of the present inventive scope. First, note that the preferred method of truncating the ratio and selecting its integer value leaves some bandwidth overage to allow for overhead in the communication stream. In other words, for the previous example of a ratio of 3.646:1, the additional 0.646 leaves more than ample room in the communication stream to accommodate overhead. Second, while the preferred method involves the truncating as just mentioned, an alternative embodiment may still be responsive to the downstream:upstream ratio as an approximate for determining the SendWindow field, but may modify it in a different manner. For example, rather than truncating that ratio, additional storage may be included with the modem so that the ratio may be rounded to the nearest integer; thus, in the instance of the ratio of 3.646:1, then the SendWindow field would be rounded up and, hence, set to 4 rather than 3; in contrast, if the ratio were less than 3.5 to 1, the SendWindow field would be set to 3. Third, the use of the downstream:upstream ratio in the manner described is particularly noteworthy given that WINDOWS, by way of example, is a system which contemplates symmetric data rates rather than asymmetric communications as is the case for DSL technology. In other words, in its current form WINDOWS is established to interact with symmetric communication devices, and thus it provides various hurdles to interfacing with an asymmetric device. Given this ostensible incompatibility, the environment of WINDOWS provides no teachings for asymmetric compatibility, and thus suggests no approach to the use of the SendWindow field in the manner of the preferred embodiment. Nevertheless, the preferred use of the downstream:upstream ratio has been laboratory tested and confirmed to provide an operable environment for a DSL modem despite the apparent limitations of WINDOWS, and further has notably increased throughput for the downstream channel. Lastly, since the SendWindow field is preferably established in response to the downstream:upstream ratio, it may be altered based on changes in that ratio as that ratio itself may change as further detailed below.

Given that the SendWindow field in the preferred embodiment is responsive to the rate of downstream and upstream communications, the preferred embodiment further contemplates that the SendWindow field may change for various reasons. As one example, in the preferred embodiment the downstream:upstream ratio is established during initialization, as more detailed in the above-incorporated U.S. patent application Ser. No. 09/000,899 now abandoned. Briefly reviewing that methodology and inviting the reader to review the cited application for more detail, preferably modem device driver 66 operates during initialization to include in its object a link speed set to the maximum downstream rate of communication. Thereafter, however, modem device driver 66 is further operable to receive a communication from modem 20 that a lesser line speed has actually been established. For instance, in the preferred embodiment there is a command referred to as a LineConfigure command which may request a different downstream rate of communication, and since this is only a request the actual granted speed may be at the requested speed or at a different speed. In any event, once the actual speed of communication is set, at that time the downstream:upstream ratio is available for determining the value for the SendWindow field. As another example, the immediately preceding discussion is directed to establishing the downstream:upstream ratio during initialization. However, in the preferred embodiment, at some time after initialization there may be a change of either the downstream or upstream rate of communication and, thus, a change in the downstream:upstream ratio at such later time. As another example, there may be a re-negotiation of either or both of the communication rates between the modems based on some change in the channel characteristics, or based on some other consideration(s) as may be ascertained by one skilled in the art. In any event, once either or both of the communication rates is changed, at that time the SendWindow field likewise may be changed under the preferred embodiment. In this regard, such a change is preferably achieved with as little disruption, if any, between the modem-to-modem connections. Indeed, if possible it is preferable that the SendWindow field change does not disturb the existing connection between the modems. However, in some configurations it may be required to re-initialize the modem-to-modem connection in order to change the SendWindow field and, thus, there may be a tradeoff if this re-initialization operation is perceived as sufficiently disruptive so as not to warrant a change in the SendWindow field.

As another aspect within the present inventive scope, it is further contemplated that the downstream:upstream ratio also may be implemented with respect to the TCP Window Size field which in certain respects may be viewed in a manner comparable to the above-described use in the SendWindow field. More particularly and by way of background, the TCP Window Size field is implemented in the prior art in the TCP protocol, as implemented by way of example in stack 58. Generally speaking, the TCP Window Size field indicates to the upper layer software the maximum number of data packets (i.e., one or more) which it may communicate to its modem for transmission, after which the upper layer awaits an acknowledgment from the receiving modem that the sent packets were received. This acknowledgment indicates whether the sent packets were received with or without errors, so that if errors were received then the sent packets may be re-sent one or more times until they are received without errors. Alternatively, a failure to receive an acknowledgment within a certain time period also may represent the need to re-send the number of data packets specified by the TCP Window Size field. Given this background, yet another aspect of the preferred embodiment is using the downstream:upstream ratio to specify, with respect to the downstream transmitting modem, the number of packets for the TCP Window Size field. As with the case of using the downstream:upstream ratio for the SendWindow field, the use with respect to the TCP Window Size also preferably represents the truncated integer of the ratio, but otherwise may be responsive to the ratio such as by rounding the integer as mentioned above. Additionally, the value may be changed from time to time based on certain operational considerations. Still further, under current MICROSOFT implementations, the manner of specifying the TCP Window Size may requires a manual setting of the parameter, but it is further contemplated that alternative systems may permit non-manual submission of the parameter such as from modem device driver 66.

From the above, it may be appreciated that the above embodiments provide a telecommunications systems including a digital subscriber line device driver using communication window sizes based on relative data rates of upstream and downstream communications. It should be further appreciated that the present embodiments provide various benefits. For example, the system described provides an operating system compatible methodology which may be used in different DSL systems. Additionally, the software implementation reduces complexity, thereby reducing cost and providing a more viable system for wide-scale use and dissemination. As still another benefit, the compatibility with WINDOWS or like operating systems provides for relatively easy installation and operation in a very large number of currently existing systems. As yet another benefit, the present teachings provide a DSL modem which may be implemented directly into an operating system such as WINDOWS without any additional support, and this is in contrast to other DSL manufacturers who often require various patches or replacements to various of the layers shown. For example, some such manufacturers currently contemplate requiring their own networking applications and/or protocols. Additionally, outside the present teachings no manufacturer is currently known to provide a working device driver which alone permits communication within the WINDOWS environment. As yet another benefit, while the preceding discussion illustrates the preferred and various alternative embodiments in detail, various substitutions, modifications or alterations could be made to the descriptions set forth above without departing from the inventive scope. Indeed, the various alternatives set forth above should demonstrate to one skilled in the art that further flexibility is contemplated. Moreover, as yet another example of an alternative, note that while the WINDOWS operating system has been demonstrated, other systems may implement the inventive teachings. As another example, while modem 20 of FIG. 2 has been discussed, many of the above aspects may be incorporated in other DSL modem architectures. As still another example, while the term data packets has been used above in connection with the SendWindow field, it should be understood that his field may apply to other protocols or systems where some other term is used for a data unit which represents user data. Therefore, the term "data packet" is not necessarily intended to be a limitation but instead merely represents a unit of information which primarily represents user data and which may be governed by the SendWindow field methodology as detailed above. Thus, these as well as other examples ascertainable by one skilled in the art should be considered within the inventive scope, as defined by the following claims.

What is claimed is:

1. A computer system comprising:
   a first DSL modem for communicating data packets with a second DSL modem after a connection is established between the first DSL modem and the second DSL modem, wherein the data packets are for communication from the first DSL modem to the second DSL modem at a downstream communications rate and wherein the data packets are for communication from the second DSL modem to the first DSL modem at an upstream communications rate;
   a memory operable to store a computer program, wherein the computer program is operable to require a data parameter indicating a number of data packets to be communicated in an instance from the computer program to the first DSL modem for communication to the second DSL modem; and
   a field for providing the data parameter to the computer program, wherein the number is responsive to a ratio of the downstream communications rate relative to the upstream communications rate.

2. The computer system of claim 1 wherein the ratio of the downstream communications rate relative to the upstream communications rate comprises an integer portion and a decimal portion, and wherein the number equals the integer portion.

3. The computer system of claim 1 wherein the ratio of the downstream communications rate relative to the upstream communications rate comprises an integer portion and a decimal portion, and wherein the number equals the integer if the decimal portion is less than 0.5 and wherein the number equals the integer plus one if the decimal portion is greater than 0.5.

4. The computer system of claim 1:
   wherein the downstream communications rate and the upstream communications rate are established during initialization of the first DSL modem; and
   wherein the field is for providing the data parameter in response to the downstream communications rate and the upstream communications rate as established during the initialization of the first DSL modem.

5. The computer system of claim 1:
   wherein the downstream communications rate comprises a first downstream communications rate established during initialization of the first DSL modem;
   wherein the upstream communications rate comprises a first upstream communications rate established during initialization of the first DSL modem;
   wherein the field is for providing the data parameter a first time in response to the first downstream communications rate and the first upstream communications rate;
   wherein a second downstream communications rate and a second upstream communications rate are established after initialization of the first DSL modem; and
   wherein the field is further for providing the data parameter a second time, after the first time, in response to a ratio of the second downstream communications rate relative to the second upstream communications rate.

6. The computer system of claim 5:
   wherein the first downstream communications rate relative to the first upstream communications rate comprises a first integer portion and a first decimal portion, and wherein the number of the data parameter of the first time equals the first integer portion; and
   wherein the second downstream communications rate relative to the second upstream communications rate comprises a second integer portion and a second decimal portion, and wherein the number of the data parameter of the second time equals the second integer portion.

7. The computer system of claim 5 wherein the field is further for re-initializing the first DSL modem between the first time and the second time.

8. The computer system of claim 1 wherein the computer program comprises an upper software layer compatible with an operating system.

9. The computer system of claim 8 wherein the operating system comprises a WINDOWS operating system.

10. The computer system of claim 8 wherein the operating system comprises a WINDOWS NT operating system.

11. The computer system of claim 8 wherein the operating system comprises a WINDOWS 95 operating system.

12. The computer system of claim 1 wherein the data packets comprise Point to Point Protocol data packets.

13. The computer system of claim 1 wherein the field is provided by a DSL modem device driver operable to communicate with the computer program.

14. The computer system of claim 1:
   wherein the field comprises a SendWindow field; and
   wherein the number of data packets to be communicated in the instance from the computer program to the first DSL modem comprises a number of packets to be communicated before the computer program receives an acknowledgment that the number of packets were received by the second DSL modem.

15. The computer system of claim 1:
   wherein the field comprises a TCP window size field; and
   wherein the number of data packets to be communicated in the instance from the computer program to the first DSL modem comprises a number of packets to be communicated before the computer program receives an acknowledgment that the number of packets were received by the second DSL modem, wherein the acknowledgment indicates whether the number of packets were received with or without errors.

16. The computer system of claim 1 wherein the first DSL modem converts each of the data packets into a corresponding user message for communicating each of the data packets to the second DSL modem.

17. The computer system of claim 1 wherein the upstream communications rate is approximately 768 kilobits per second and the downstream communications rate is approximately 2.8 megabits per second.

18. The computer system of claim 17 wherein the number equals three.

19. A computer readable medium operable to be read into a computer memory of a computer and for controlling communications of data packets of a first DSL modem coupled to the computer, wherein the data packets are for communication from the first DSL modem to a second DSL modem at a downstream communications rate and wherein the data packets are for communication from the second DSL modem to the first DSL modem at an upstream communications rate; wherein the controlling steps comprise:

determining a ratio responsive to the downstream communications rate relative to the upstream communications rate; and providing a data parameter to a computer program in the computer memory indicating a number of data packets to be communicated in an instance from the computer program to the first DSL modem for communication to the second DSL modem, wherein the number is responsive to the radio.

20. The computer readable medium of claim 19:

wherein the ratio of the downstream communications rate relative to the upstream communications rate comprises an integer portion and a decimal portion; and wherein the number equals the integer portion.

21. The computer readable medium of claim 19:

wherein the ratio of the downstream communications rate relative to the upstream communications rate comprises an integer portion and a decimal portion; and wherein the number equals the integer if the decimal portion is less than 0.5 and wherein the number equals the integer plus one if the decimal portion is greater than 0.5.

22. A method of operating a first DSL modem for communicating data packets with a second DSL modem, comprising the steps of:

establishing a connection between the first DSL modem and the second DSL modem, wherein the connection permits data packets for communication from the first DSL modem to the second DSL modem at a downstream communications rate and data packets for communication from the second DSL modem to the first DSL modem at an upstream communications rate;

operating a computer program, wherein the computer program requires a data parameter indicating a number of data packets to be communicated in an instance from the computer program to the first DSL modem for communication to the second DSL modem; and providing the data parameter to the computer program, wherein the number is responsive to a ratio of the downstream communications rate relative to the upstream communications rate.

23. The method of claim 22:

wherein the step of providing the data parameter comprises providing a SendWindow field; and wherein the number of data packets to be communicated in the instance from the computer program to the first DSL modem comprises a number of packets to be communicated before the computer program receives an acknowledgment that the number of packets were received by the second DSL modem.

24. The method of claim 23 within the step of providing the SendWindow field comprises executing a modem device driver operable to control the first DSL modem, wherein the device driver provides the SendWindow field.

25. The method of claim 22:

wherein the step of providing the data parameter comprises providing a TCP window size field; and wherein the number of data packets to be communicated in the instance from the computer program to the first DSL modem comprises a number of packets to be communicated before the computer program receives an acknowledgment that the number of packets were received by the second DSL modem, wherein the acknowledgment indicates whether the number of packets were received with or without errors.

\* \* \* \* \*